(12) United States Patent
Margalit

(10) Patent No.: US 12,042,956 B2
(45) Date of Patent: Jul. 23, 2024

(54) SELF-CLEANING GRAVIMETRIC AND VOLUMETRIC DOSING APPARATUSES

(71) Applicant: Ampacet Corporation, Tarrytown, NY (US)

(72) Inventor: Eli Margalit, Misgav (IL)

(73) Assignee: AMPACET CORPORATION, Tarrytown, NY (US)

( * ) Notice: Subject to any disclaimer, the term of this patent is extended or adjusted under 35 U.S.C. 154(b) by 243 days.

(21) Appl. No.: 17/632,890

(22) PCT Filed: Aug. 5, 2020

(86) PCT No.: PCT/US2020/045036
§ 371 (c)(1),
(2) Date: Feb. 4, 2022

(87) PCT Pub. No.: WO2021/026253
PCT Pub. Date: Feb. 11, 2021

(65) Prior Publication Data
US 2022/0212366 A1    Jul. 7, 2022

(30) Foreign Application Priority Data

Aug. 6, 2019  (IL) .......................................... 268544

(51) Int. Cl.
*B29B 7/60*    (2006.01)
*B29B 7/72*    (2006.01)
(Continued)

(52) U.S. Cl.
CPC ................ *B29B 7/603* (2013.01); *B29B 7/72* (2013.01); *B29B 7/78* (2013.01); *B29B 7/802* (2013.01);
(Continued)

(58) Field of Classification Search
CPC ........ B29B 7/603; B29B 7/802; B29C 48/271
See application file for complete search history.

(56) References Cited

U.S. PATENT DOCUMENTS

| 3,746,489 A | 7/1973 | Rizzi et al. |
| 4,573,900 A | 3/1986 | Smith |
| (Continued) | | |

FOREIGN PATENT DOCUMENTS

| CN | 108673823 A | 10/2018 |
| DE | 102011112016 B3 | 1/2013 |
| (Continued) | | |

OTHER PUBLICATIONS

International Search Report and Written Opinion dated Nov. 24, 2020 for Application No. PCT/US20/45036; 7 pages.

(Continued)

*Primary Examiner* — J C Jacyna
(74) *Attorney, Agent, or Firm* — SMITH, GAMBRELL & RUSSELL, LLP.

(57) ABSTRACT

A self-cleaning dosing apparatus includes a material hopper for containing pellets of material, a feed screw, a first material outlet through which pellets of material fall by gravity onto a first end of the feed screw for the feeding of pellets to a process machine. A second material outlet is located beneath the first end of the feed screw, with a slide gate blocking the second material outlet. A pneumatic piston is provided for pulling the slide gate to unblock the second material outlet, and a Venturi pump is located under the second material outlet for pulling pellets through the second material outlet when the slide gate is opened.

13 Claims, 6 Drawing Sheets

(51) Int. Cl.
*B29B 7/78* (2006.01)
*B29B 7/80* (2006.01)
*B29C 31/02* (2006.01)
*B29C 45/18* (2006.01)
*B29C 48/27* (2019.01)
*B29C 48/285* (2019.01)
*B29C 48/92* (2019.01)

(52) U.S. Cl.
CPC .......... *B29C 31/02* (2013.01); *B29C 45/1808* (2013.01); *B29C 48/271* (2019.02); *B29C 48/286* (2019.02); *B29C 48/92* (2019.02); *B29C 2045/1875* (2013.01); *B29C 2948/9218* (2019.02); *B29C 2948/92333* (2019.02); *B29C 2948/9238* (2019.02)

(56) References Cited

U.S. PATENT DOCUMENTS

| | | |
|---|---|---|
| 4,632,564 A | 12/1986 | Kopernicky |
| 4,959,931 A | 10/1990 | Howells |
| 5,163,486 A | 11/1992 | Rogers et al. |
| 5,261,743 A | 11/1993 | Moller |
| 5,350,089 A | 9/1994 | Preiser et al. |
| 5,863,155 A * | 1/1999 | Segota ............... B65G 53/08 406/61 |
| 5,988,461 A | 11/1999 | Edney et al. |
| 6,474,972 B1 | 11/2002 | Endo et al. |
| 6,688,493 B2 | 2/2004 | Margalit |
| 7,810,986 B2 | 10/2010 | Landers et al. |
| 2002/0084293 A1 | 7/2002 | Margalit |
| 2011/0223276 A1 | 9/2011 | Bollschweiler |
| 2015/0367553 A1* | 12/2015 | Backmann ............ B29C 48/271 134/22.11 |
| 2016/0001477 A1* | 1/2016 | Okabe ................... B29C 45/50 264/328.14 |
| 2018/0126597 A1* | 5/2018 | Rust .................... B01D 46/4263 |
| 2022/0105547 A1* | 4/2022 | Schmudde ............. B29B 7/802 |

FOREIGN PATENT DOCUMENTS

| | | |
|---|---|---|
| EP | 0 318 170 A2 | 5/1989 |
| EP | 2 564 946 A1 | 3/2013 |
| EP | 2 636 503 A1 | 9/2013 |
| EP | 3308922 A1 | 4/2018 |
| GB | 2 338 920 A | 1/2000 |
| JP | H07-1444 A | 1/1995 |
| KR | 100905076 B1 | 6/2009 |
| KR | 20190122087 A | 10/2019 |

OTHER PUBLICATIONS

First Office Action dated Sep. 28, 2023 for Chinese Patent Application No. 202080055963.5 (9 pages in Chinese; 10 Pages English translation).

Extended European Search Report dated Jul. 26, 2023 for European Patent Application No. 20851167.5 (8 pages).

He, Shouzhi. Phacoemulsification. 2000. China Medical Science Press. Pages 8-9 (in Chinese with English machine translation).

* cited by examiner

SELF-CLEANING GRAVIMETRIC AND VOLUMETRIC DOSING APPARATUSES

CROSS-REFERENCE TO RELATED APPLICATION

This application claims benefit of and priority to Israel Patent Application No. 268544 filed Aug. 6, 2019, which is incorporated herein by reference in its entirety.

FIELD OF THE INVENTION

The invention is from the field of adding raw material to production machines for producing products by means of industrial processes. Specifically the invention is relates to the addition of small quantities of masterbatch to production machines that produce products made from plastic.

BACKGROUND OF THE INVENTION

In the modern world plastics are the material of choice for the manufacture of a seemingly unlimited number of products. These products are produced by a variety of industrial processes, e.g. injection molding, blow molding, extrusion, and 3-D printers. The raw material that is fed into the machines used to produce the final products is a mixture consisting of: polymers (called resin in the industry) in the form of small beads, colorants and other additives, e.g. UV inhibitors. The colorants and other additives are supplied as masterbatches, which are concentrated mixtures of pigments and/or additives encapsulated during a heat process into a carrier resin which is then cooled and cut into a granular shape.

Herein the terms "bead", "pellet", and "granule" are used interchangeably to refer to a small piece of material typically having a weight in the range of 0.01 g-0.04 g.

In the majority of present day plastic product production facilities, the resin is fed in controlled amounts directly into the production machines and the desired color of the plastic product is achieved by feeding the masterbatch, which is the color additive and has the same shade as the required shade of the final product, by relatively small gravimetric or volumetric dosing system installed on the throat of the processing machine.

U.S. Pat. No. 6,911,607 describes a typical gravimetric dosing system of this type. The system comprises a container, which is filed with an additive material. The additive material is dosed into and mixed with a basic flow that is feed into a processing device by a dosing mechanism comprised of a motor that rotates a worm screw in a cylindrical insert that projects out of the container. A load cell weighs the container, dosing mechanism, and the additive material in both of them. Loss-of-weight measurements are used to calibrate the rotation speed of the worm screw to provide the desired dosing rate. As explained in the application, the design of the system results in weighing errors that are compensated for by use of calibration graphs determined by experiment for each different additive material. The weighing errors are caused by shifting center of gravity of the container and dosing mechanism caused when material is added to or removed from the container and non-linearity between the rotation speed of the motor and the discharge of the dosing mechanism in mass per unit time. One type of weighing error that cannot be compensated for is caused by noise and vibration, e.g. of the motor in the dosing mechanism, processing device, and persons moving in the vicinity of the dosing system, or by someone or something touching the container.

U.S. Pat. No. 6,688,493, to the inventor of the present invention, describes a gravimetric dosing system that provides solutions to the weighing errors that are inherent in the system described in U.S. Pat. No. 6,911,607. FIG. 1 illustrates a schematic block diagram of the system of U.S. Pat. No. 6,688,493. The system includes a container 10, a material hopper 11 located inside the container 10, a load cell 16 coupled to the material hopper 11, a controller 13 that calculates weight according to the load cell 16 information and commands the motor 14 of the screw feeder 12 to dispense portions of material into a molding machine 15. The inclined and parallel walls of the hopper 11 minimize weight errors and facilitate weight calibration by keeping the material-pressure in the hopper 11 constant.

The material must be fed to the molding machine in accurate-weight portions and each portion must be fed at given time and for a given duration. To achieve this target the controller 13 commands the motor 14 of the screw feeder 12 to start rotating with a specific spin at the given time for the given duration. Since the given time and duration of feeding are determined by the molding machine 15, the rotation of the screw feeder 12 is the only variable that can be used to control the weight of the fed portion.

FIG. 2 illustrates the cross-section of the system with material in the material hopper and the system in a work or ready to work configuration. The material 17, which fills the material hopper 11, is fed through an outlet 18 of the material hopper 11 to a space 19 created between outlet 18 of the material hopper and an outlet 20 of the container 10. From this space 19 the material 17 is fed through the outlet 20 of the container 10 into the screw feeder 12. The outlet 18 of the material hopper is shifted from the outlet 20 of the container to enable keeping the material in the outlet-shaft 21 constant as long as the material level 22 is higher than the upper end of the outlet-shaft 21 and to isolate the material hopper 11. The part of the material 17 located in the space 19 acts as a buffer, which isolates the material hopper 11 and limits noise and shaking coming from the screw feeder 12 and its motor 14, to enable an accurate weighing of the material hopper 11 by the load cell 16. The controller 13 commands a refill means 23 to refill the material hopper 11 when the material level 22 is reduced to a threshold level.

All known gravimetric and volumetric dosing systems designed for directly adding small quantities of additive, e.g. masterbatch, directly into the throat of a production machine have essentially the same structure and operate in the same manner as that described with respect to FIG. 1 and FIG. 2. It is noted that a volumetric dosing system is also manufactured by the applicant of this application. The volumetric system is identical to the gravimetric one shown in FIGS. 1 and 2 with the exception that the volumetric system does not comprise a load cell and the feeding during production runs is dependent on the assumption that the properties of the material, e.g. the specific gravity, and/or of the material streaming properties do not change after the initial calibration of the feed screw rotation rate is made.

One of the practical disadvantageous of working with dosing systems of the type described above is that a considerable amount of time is required to empty the material hopper and clean all traces of material from the hopper and screw each time that the material has to be changed in order to produce products having a different color.

It is a purpose of the present invention to provide a solution to this problem in the form of components added to the conventional system that can be activated to perform a self-cleaning function.

Further purposes and advantages of this invention will appear as the description proceeds.

SUMMARY OF THE INVENTION

Described herein is a self-cleaning dosing apparatus that comprises:
a) a material hopper containing pellets of material;
b) a feed screw;
c) a first material outlet through which pellets of material fall by gravity onto a first end of the feed screw;
d) a cylindrical insert that surrounds the feed screw; and
e) a motor that is connected to the first end of the feed screw and rotates the feed screw inside of the cylindrical insert to push pellets of masterbatch to a second end of the feed screw where the pellets of material fall out of the cylindrical insert.

The self-cleaning dosing apparatus additionally comprises:
i) a second material outlet located beneath the first end of the feed screw;
ii) a slide gate that blocks the second material outlet;
iii) a pneumatic piston that pulls the slide gate back to unblock the second material outlet;
iv) a Venturi pump located under the second material outlet; and
v) an air nozzle located opposite the second end of the feed screw and is configured to create and direct a stream of air through the cylindrical insert.

In the self-cleaning dosing apparatus:
ai) the motor is configured to reverse the direction of rotation of the feed screw, thereby causing the pellets of material between threads of the feed screw to be transported backwards towards the second material outlet;
aii) the stream of air created by the air nozzle pushes pellets of material that have fallen to the bottom of the cylindrical insert back through the cylindrical insert towards the second material outlet; and
aiii) the Venturi pump pulls all pellets of material that fall from the material hopper through first material outlet and the second material outlet and the pellets of material that are pushed out of the feed screw and the cylindrical insert by the reverse rotation of the feed screw and the stream of air from the nozzle out of the apparatus;

As a result of the activities described in ai) to aiii) all traces of the material are completely removed from material hopper, the feed screw, and the cylindrical insert.

Embodiments of the self-cleaning dosing apparatus comprise:
a) a container surrounding the material hopper; and
b) a load cell attached to the material hopper, the load cell is configured to weigh the material hopper and material inside the material hopper.

In embodiments of the self-cleaning dosing apparatus the material is masterbatch.

Embodiments of the self-cleaning dosing apparatus are configured to add small quantities of masterbatch to resin introduced into production machines to produce colored products made from plastic.

Embodiments of the self-cleaning dosing apparatus are configured to be used with injection molding, extrusion, and extrusion blow molding production machines.

In embodiments of the self-cleaning dosing apparatus the pellets of material removed from the material hopper, feed screw, and cylindrical insert by the Venturi pump are returned to a container used to supply the same material to the material hopper.

All the above and other characteristics and advantages of the invention will be further understood through the following illustrative and non-limitative description of embodiments thereof, with reference to the appended drawings.

DETAILED DESCRIPTION OF EMBODIMENTS OF THE INVENTION

Described herein are self-cleaning gravimetric and volumetric dosing apparatuses. The apparatuses are designed to add small quantities of masterbatch to the resin introduced into production machines to produce colored products made from plastic. The self-cleaning apparatuses enable automatic removal of all pellets of a first type of masterbatch from their interiors before a second type of masterbatch is introduced into the apparatus. The apparatuses can be used with production machines for any type of plastic manufacturing process, e.g. injection molding, extrusion, and extrusion blow molding.

Figure 1:
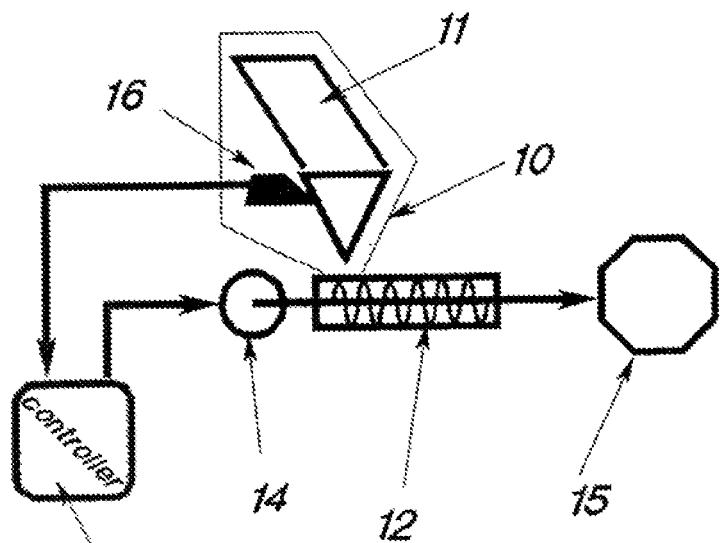
FIG. 1 schematically shows a prior art gravimetric dosing system.
Figure 2:
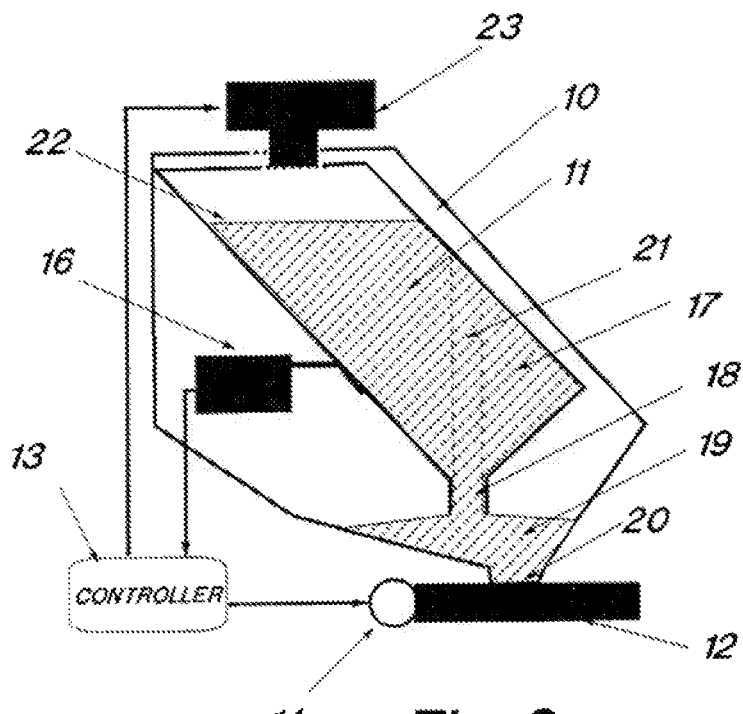
FIG. 2 is a cross-sectional view of the system of FIG. 1.
Figure 3:
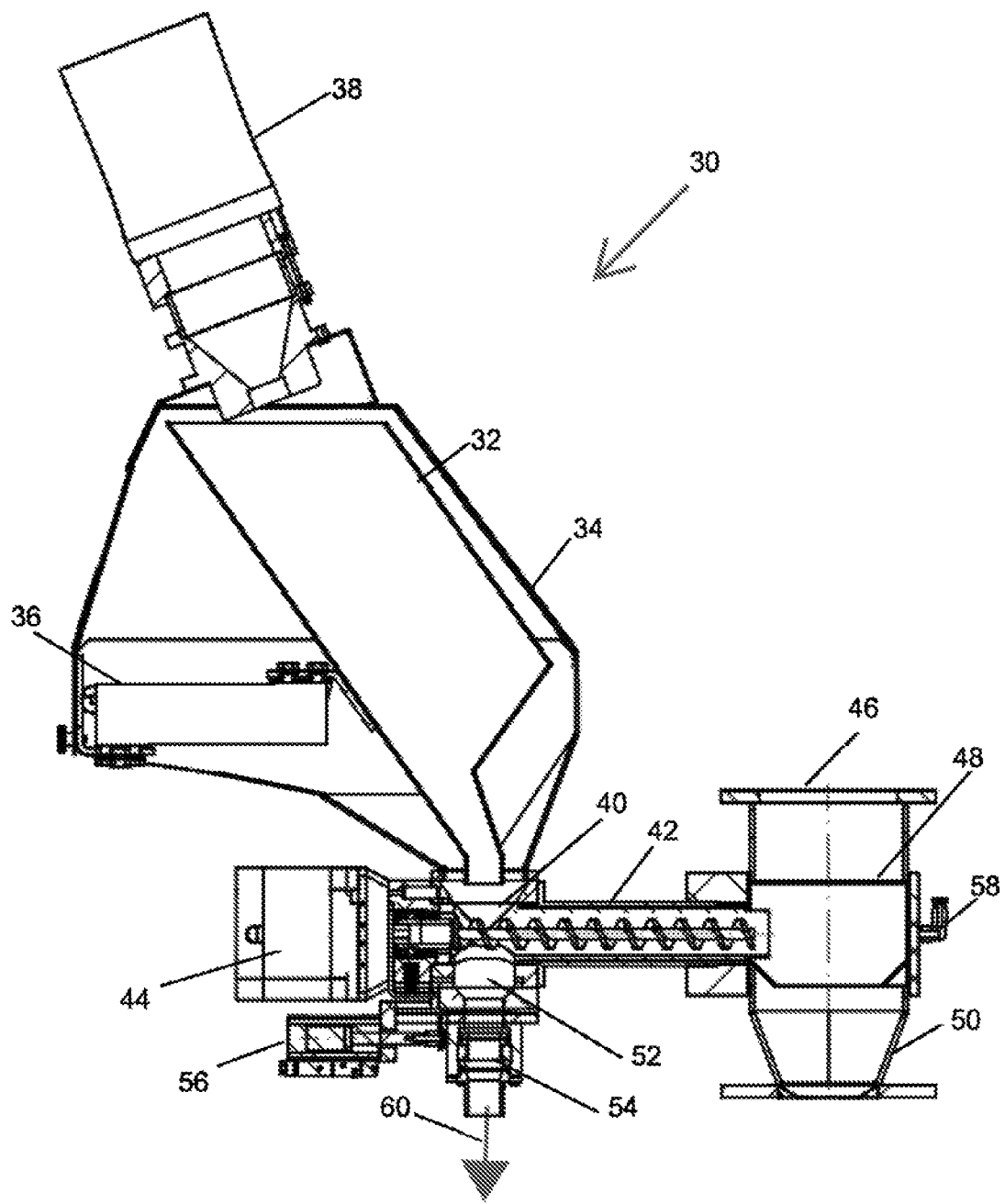
FIG. 3 schematically shows a self-cleaning gravimetric dosing apparatus.

FIG. 3 schematically shows an embodiment of self-cleaning gravimetric dosing apparatus 30. Apparatus 30 comprises a material hopper 32 located inside a container 34. A load cell 36 is attached to material hopper to weigh material hopper 32 and masterbatch introduced into it by means of material loader 38. In operation, pellets of masterbatch fall by gravity from material hopper through first material outlet 40 into feed screw 42. A reversible motor 44 rotates feed screw 42 to push pellets of masterbatch to the end of feed screw 42 where they fall through the neck piece 46 (under the roof of the neckpiece 48) into the throat 50 of the production machine. Not seen in the figure is a controller that receives weight data from load cell to determine the weight of masterbatch that is dispensed by the apparatus by using the loss-in-weight method. After calibration, the controller activates the motor 44 and adjusts the speed of rotation of the screw to dispense accurate weight portions of masterbatch in a given time and for a given duration. If material loader 38 is for example a Venturi loader, then the controller activates it to refill the material hopper 32 upon receiving a signal from a sensor inside the hopper indicating that the level of masterbatch has fallen to a threshold value.

Figure 4:
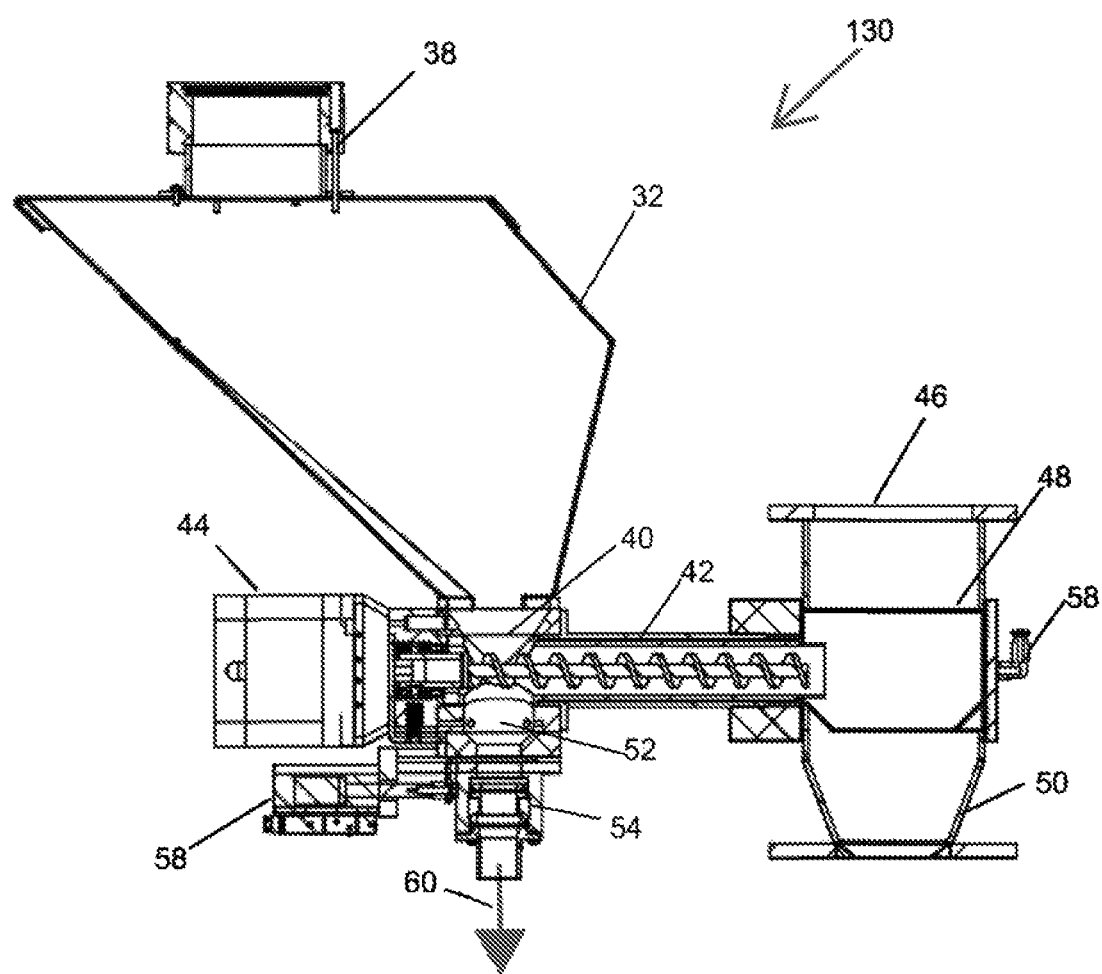
FIG. 4 schematically shows a self-cleaning volumetric dosing apparatus.

FIG. 4 schematically shows an embodiment of a self-cleaning volumetric dosing apparatus 130. Apparatus 130 is identical to apparatus 30 in FIG. 3, with the exceptions that apparatus 130 does not comprise a load cell 36 and therefore does not require a container 34 to isolate the material hopper 32 from vibration and to improve the accuracy of the weights measured by the load cell.

The components of apparatus 30 and apparatus 130 described above are identical structurally and functionally to those found in the prior art gravimetric and volumetric dosing systems. A controller and the cables that connect it to sensors and electric valves at various locations in the system are not shown in FIGS. 3 and 4 or the following figures because they are not relevant to the present invention.

The new components of apparatuses 30 and 130 that enable the self-cleaning function will now be described with reference to FIGS. 3 and 4 and particularly FIG. 5, which is an enlarged view schematically showing the components of apparatuses 30 and 130 that are located beneath the material hopper 32.

Figure 5:
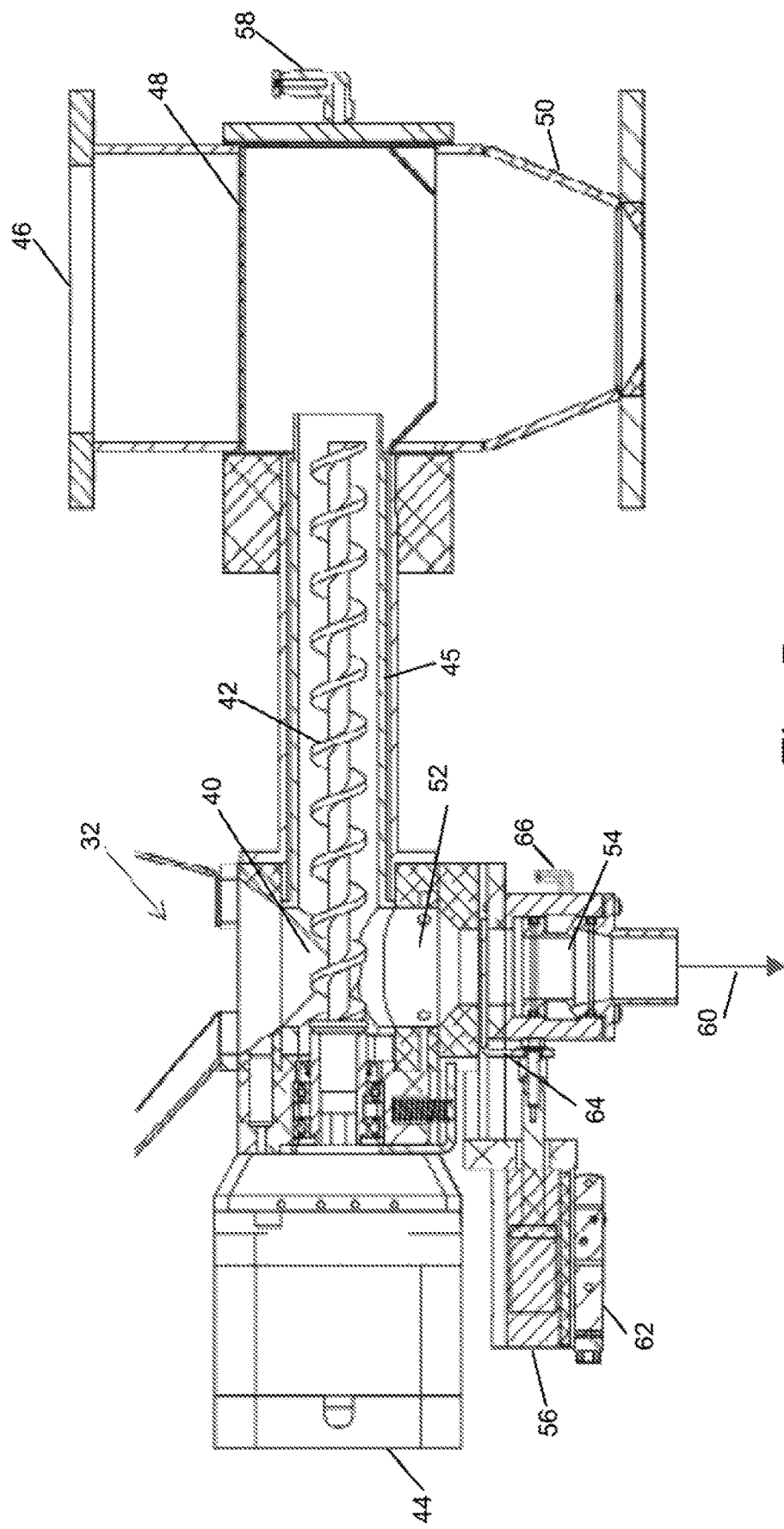
FIG. 5 schematically shows an enlarged view the components of the apparatuses of FIG. 3 and FIG. 4 that are located beneath the material hopper.

Seen in FIG. 5 are material hopper 32 and a first material outlet 40 at the bottom of the hopper. In operation, masterbatch falls from material hopper 32 through first material opening 40 onto feed screw 42, which is rotated by motor 44. As feed screw 42 turns inside of cylindrical insert 45 pellets of masterbatch are moved one at a time to the end of the feed screw where they fall into a space below cover 48 of the neck piece 46 of the process machine to which apparatus 30 or 130 is attached. From the neck piece 46 the pellets fall through throat 50 into the process machine.

When it is desired to change from a masterbatch having a first color to one having a second color, motor 44 is reversed to reverse the rotation of feed screw 42 causing the pellets of masterbatch between threads of the feed screw 42 to be transported backwards towards second material outlet 52. At the same time a signal is sent to solenoid valve 62 that opens to allow compressed air to enter normally closed pneumatic piston 56 to pull back a slide gate 64 opening a second material outlet 52. Simultaneously with the opening of second material outlet 52, compressed air is introduced into Venturi pump 54 via air inlet 52 and compressed air is introduced into neck 46 of the processing machine via nozzle 58. Nozzle 58 creates a stream of air that enters the end of the feed screw 42 and pushes pellets of masterbatch that have fallen to the bottom of cylindrical insert 45 back through the cylindrical insert 45 towards second material outlet 52. The Venturi pump 54 pulls all pellets of masterbatch, i.e. those that fall from the material hopper 32 through first material outlet 40 and second material outlet 52 and the pellets of masterbatch that are pushed out of the feed screw 42 and cylindrical insert 45 by the reverse rotation of feed screw 42 and the stream of air from nozzle 58, out of the apparatus in the direction indicated by arrow 60. From the outlet of Venturi pump 54 the pellets of masterbatch will be returned to a container used to supply masterbatch to material hopper 32 (see FIG. 8). Thus, the combined efforts of Venturi pump 54, reversal of rotation of the feed screw 42 and the stream of air produced by nozzle 58 thoroughly remove all traces of the masterbatch from material hopper 32, feed screw 42, and cylindrical insert 45.

Figure 6:
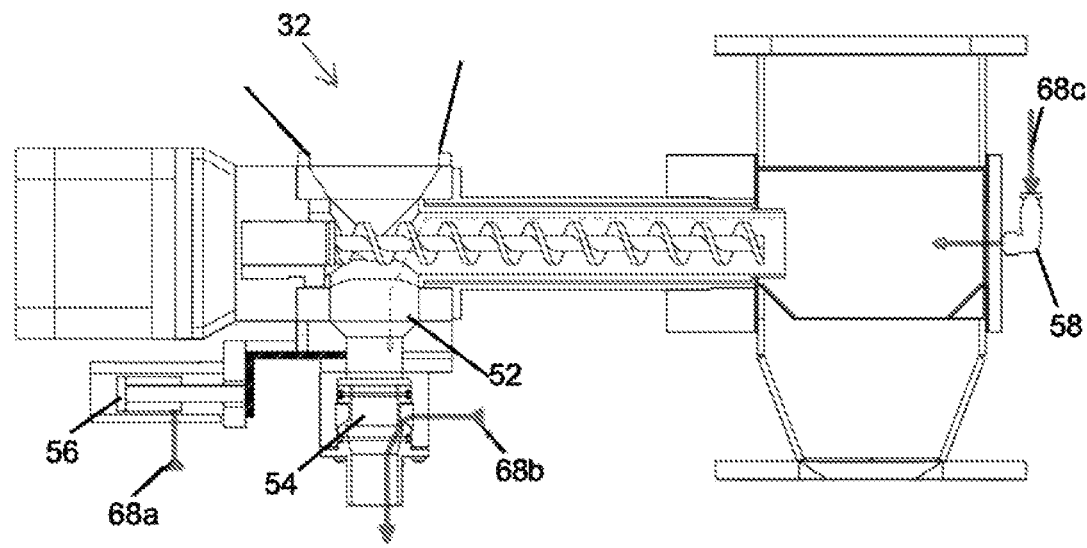
FIG. 6 schematically shows the direction of air flow through the apparatus during the cleaning process.

FIG. 6 schematically shows the direction of air flow through the apparatus during the cleaning process. Note how during the cleaning process the slide gate 64 is pulled back to unblock the second material outlet 52. Reference signs 68a, 68b, and 68c schematically represent compressed lines from a compressor (not shown) to piston 56, Venturi pump 54, and nozzle 58 respectively.

Figure 7:
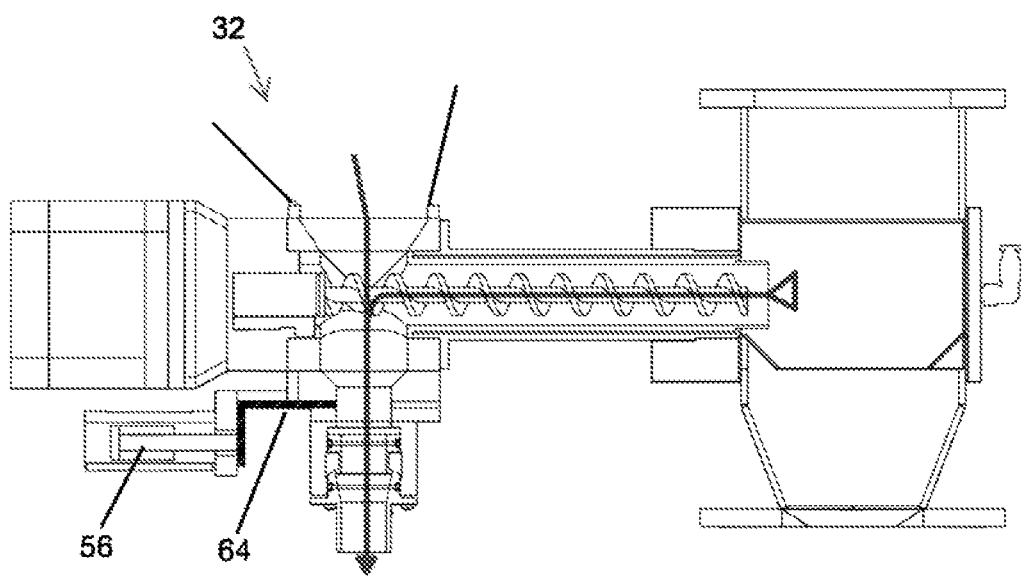
FIG. 7 schematically shows the direction of motion of granules of masterbatch out of the apparatus through the outlet of the Venturi pump during the cleaning process.

FIG. 7 schematically shows the direction of motion of granules of masterbatch out of the apparatus through the outlet of the Venturi pump during the cleaning process.

Figure 8:
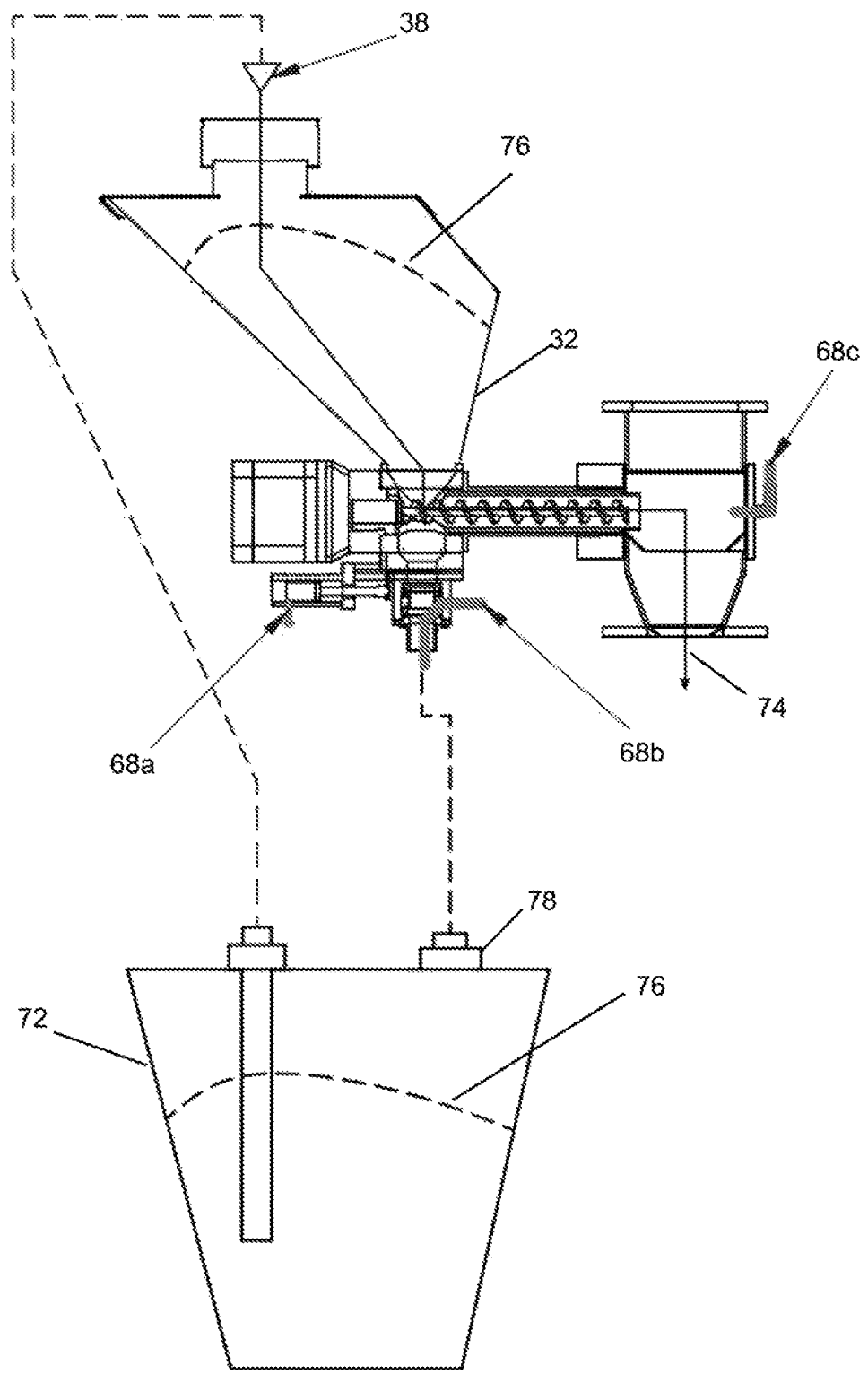
FIG. 8 schematically shows how the masterbatch removed from the apparatus 30 or apparatus 130 is returned to the supply container 72 during the cleaning process.

FIG. 8 schematically shows how masterbatch is supplied to material hopper 32 and the masterbatch that is removed from the apparatus 30 or apparatus 130 is returned to a supply container 72 during the cleaning process. Container 72, which is the container in which the masterbatch is supplied from the producer or in which it is stored in the manufacturing facility is normally located in a storage area a distance from the production machines and attached dosing apparatus 30,130. During production runs, if the level of masterbatch 76 in material hopper 32 drops to a low threshold value, then material loader 38 is activated to draw masterbatch out of container 72 until level 76 reaches an upper threshold value when material loader is deactivated. After the production run is completed, the feed screw rotation is reversed and compressed air is introduced via air lines 68a, 68b, and 68c to empty all pellets of masterbatch from the material hopper and feed screw 42 as described herein above. The pellets that exit through the outlet of the Venturi pump 54 are then transported to container 72 by any means known in the art, for example they are pulled through a tube connected to the outlet of Venturi pump 54 by a material loader, e.g. a Venturi pump, attached to container 72. In FIG. 8, arrow 74 symbolically shows the direction of pellets of masterbatch falling off the end of the feed screw into the throat of a process machine.

Although embodiments of the invention have been described by way of illustration, it will be understood that the invention may be carried out with many variations, modifications, and adaptations, without exceeding the scope of the claims.

I claim:

1. A self-cleaning dosing apparatus comprising:
   a material hopper adapted to contain pellets of material;
   a feed screw;
   a first material outlet at the material hopper adapted to deliver pellets of material to a first end of the feed screw;
   a cylindrical insert surrounding the feed screw;
   a motor configured to rotate the feed screw inside of the cylindrical insert to push pellets of material to a second end of the feed screw where the pellets of material fall out of the cylindrical insert;
   a second material outlet located beneath the first end of the feed screw;
   a gate configured to selectively block the second material outlet;
   a piston configured to open the gate to unblock the second material outlet;
   a pump located under the second material outlet; and
   an air nozzle configured to create and direct a stream of air through the cylindrical insert;
   wherein:
   the motor is configured to reverse the direction of rotation of the feed screw to thereby transport pellets of material located between threads of the feed screw backwards towards the second material outlet;
   the air nozzle is configured to direct the stream of air to push pellets of material that have fallen to a bottom of the cylindrical insert back through the cylindrical insert towards the second material outlet; and the Venturi pump is configured to pull pellets of material from the material hopper through the first material outlet and from the feed screw through the second material outlet to direct the pellets of material out of the apparatus.

2. The self-cleaning dosing apparatus of claim 1 comprising:
a container surrounding the material hopper; and
a load cell attached to the material hopper, the load cell configured to weigh the material hopper and pellets of material inside the material hopper.

3. The self-cleaning dosing apparatus of claim 1, wherein the apparatus is configured to contain and transport masterbatch as the pellets of material.

4. The self-cleaning dosing apparatus of claim 3, wherein the apparatus is configured to add small quantities of masterbatch to resin and then introduce the resin into production machines for the production of colored products made from plastic.

5. The self-cleaning dosing apparatus of claim 4, wherein the apparatus is configured to be used with one or more of: injection molding production machines, extrusion production machines, and extrusion blow molding production machines.

6. The self-cleaning dosing apparatus of claim 1, wherein the apparatus is configured to deliver pellets of material removed from the material hopper, the feed screw, and the cylindrical insert to a container that is configured for supplying the same pellets of material to the material hopper.

7. The self-cleaning dosing apparatus of claim 2, wherein the load cell is positioned within the container surrounding the material hopper.

8. The self-cleaning dosing apparatus of claim 1, wherein the air nozzle is positioned proximate the second end of the feed screw and configured to create and direct a stream of air from the second end of the feed screw toward the first end of the feed screw.

9. The self-cleaning dosing apparatus of claim 1, wherein the gate configured to selectively block the second material outlet is a slide gate adapted to selectively slide between a closed position and an open position.

10. The self-cleaning dosing apparatus of claim 1, wherein the piston configured to open the gate is a pneumatic piston.

11. The self-cleaning dosing apparatus of claim 1, wherein the pump configured to pull pellets of material through the first material outlet and the second material outlet is a Venturi pump.

12. The self-cleaning dosing apparatus of claim 1, further comprising an air inlet configured to create and direct a stream of air through the pump for pulling pellets of material into the pump.

13. The self-cleaning dosing apparatus of claim 1, wherein the pump is configured to remove substantially all traces of the pellets of material from the material hopper, the feed screw, and the cylindrical insert.

* * * * *